(12) United States Patent
Heine et al.

(10) Patent No.: US 9,217,632 B2
(45) Date of Patent: Dec. 22, 2015

(54) SYSTEM AND METHOD FOR DETERMINING THE POSITION OF A COMMUNICATION PLATFORM

(71) Applicant: Tesat-Spacecom GmbH & Co. KG, Backnang (DE)

(72) Inventors: Frank Heine, Mainhardt (DE); Matthias Motzigemba, Oppenweiler (DE); Stefan Seel, Murrhardt (DE)

(73) Assignee: Tesat-Spacecom GmbH & Co. KG, Backnang (DE)

( * ) Notice: Subject to any disclaimer, the term of this patent is extended or adjusted under 35 U.S.C. 154(b) by 0 days.

(21) Appl. No.: 13/929,239

(22) Filed: Jun. 27, 2013

(65) Prior Publication Data

US 2014/0009749 A1     Jan. 9, 2014

Related U.S. Application Data

(60) Provisional application No. 61/665,506, filed on Jun. 28, 2012.

(30) Foreign Application Priority Data

Jun. 28, 2012   (DE) .......................... 10 2012 012 898

(51) Int. Cl.
*G01B 11/14*     (2006.01)
*G01S 5/00*      (2006.01)
(Continued)

(52) U.S. Cl.
CPC . *G01B 11/14* (2013.01); *G01S 5/00* (2013.01); *G01S 5/12* (2013.01); *G01S 5/16* (2013.01)

(58) Field of Classification Search
CPC ............. G01B 11/14; G01S 5/00; G01S 5/12; G01S 5/16
USPC .................. 356/5.01, 614; 398/121; 455/12.1
See application file for complete search history.

(56) References Cited

U.S. PATENT DOCUMENTS

| | | | | | |
|---|---|---|---|---|---|
| 3,206,605 | A | * | 9/1965 | Johns ......................... | 250/203.2 |
| 4,359,733 | A | * | 11/1982 | O'Neill ............................ | 342/36 |
| 4,918,609 | A | * | 4/1990 | Yamawaki ..................... | 701/478 |

(Continued)

FOREIGN PATENT DOCUMENTS

| | | |
|---|---|---|
| DE | 35 26 564 A1 | 2/1987 |
| GB | 2 089 615 A | 6/1982 |
| WO | WO 00/52496 A1 | 9/2000 |

OTHER PUBLICATIONS

Fidler et al. Optical Communications for High-Altitude Platforms', IEEE, vol. 16. No. 5, 2010'.*

(Continued)

*Primary Examiner* — Tien Dinh
*Assistant Examiner* — Assres H Woldemaryam
(74) *Attorney, Agent, or Firm* — Crowell & Moring LLP (57) ABSTRACT

A system and method for determining a position of a communication platform involves a first communication platform and a second communication platform. The first communication platform is in communicative contact with the second communication platform, and the communication connection is a focusable communication connection. The direction and/or orientation of the focusing of the communication connection is determinable and, by determining the focusing of the communication connection, a position of the second communication platform is determinable.

19 Claims, 3 Drawing Sheets

(51) Int. Cl.
*G01S 5/12* (2006.01)
*G01S 5/16* (2006.01)

(56) References Cited

U.S. PATENT DOCUMENTS

| | | | | |
|---|---|---|---|---|
| 5,099,245 | A * | 3/1992 | Sagey | 342/357.2 |
| 5,119,225 | A * | 6/1992 | Grant et al. | 398/123 |
| 5,126,748 | A * | 6/1992 | Ames et al. | 342/353 |
| 5,265,025 | A * | 11/1993 | Hirata | 701/469 |
| 5,372,340 | A * | 12/1994 | Ihara et al. | 244/172.5 |
| 6,674,398 | B2 * | 1/2004 | Murphy | 342/357.21 |
| 6,766,987 | B2 * | 7/2004 | Taormina et al. | 244/158.4 |
| 2008/0012751 | A1 * | 1/2008 | Owens et al. | 342/62 |
| 2008/0044187 | A1 * | 2/2008 | Krill et al. | 398/121 |
| 2009/0028573 | A1 * | 1/2009 | Krill et al. | 398/125 |
| 2011/0263199 | A1 * | 10/2011 | Cruz et al. | 455/12.1 |
| 2012/0039599 | A1 | 2/2012 | Von Schwake | |

OTHER PUBLICATIONS

European Search Report dated Dec. 20, 2013 with English translation (three (3) pages).

Franz Fidler et al., "Optical Communications for High-Altitude Platforms", IEEE Journal of Selected Topics in Quantum Electronics, Sep.-Oct. 2010, pp. 1058-1070, vol. 16, No. 5.

* cited by examiner

SYSTEM AND METHOD FOR DETERMINING THE POSITION OF A COMMUNICATION PLATFORM

CROSS-REFERENCE TO RELATED APPLICATIONS

This application claims priority under 35 U.S.C. §119 to U.S. Provisional Application No. 61/665,506, filed Jun. 28, 2012, and German Patent Application No. 10 2012 012 898.3, filed Jun. 28, 2012, the entire disclosure of each of these applications is herein expressly incorporated by reference.

BACKGROUND AND SUMMARY OF THE INVENTION

Exemplary embodiments of the present invention relate to a system and for determining the position of a communication platform. In particular, the present invention relates to position determination using a directed or focused communication connection from one communication platform to another communication platform or between these two communication platforms.

Various methods tier determining a position are currently known, for example a means of locomotion on the ground or in the air space above. The most common absolute position determination method is based on radio frequency satellite signals, for example, the Global Positioning System (GPS) or the similar Galileo and Glonass systems. By the receipt of corresponding signals from at least three satellites and by triangulation using the known absolute satellite positions, the position of the receiver in three-dimensional space can be determined. However, satellite-based location determination methods using RF signals are prone to failure for example, through established near-earth orbit jamming transmitters, which superimpose signals on the RF signals emitted by the satellites making their evaluation difficult or impossible.

Other well-known position determination methods, for example based on a known infrastructure of communication networks, are also available.

Relative position determination methods use, for example, the direction of movement as well as elapsed time, for example, by using a time instrument or a gyroscope or gyro compass in order to determine a relative change in position starting from a known position and direction of movement, and thus calculating an actual position. However, it is common in relative positioning methods that small errors or deviations in the course determination accumulate over time and can lead to an assumed but significantly wrong position.

Exemplary embodiments of the present invention provide a novel position determination that enables absolute positioning that is comparable to satellite-based radio frequency signals, but offers reduced susceptibility to faults.

Accordingly, exemplary embodiments of the present invention are directed to a system for determining the position of a communication platform is disclosed by means of a first communication platform and a second communication platform, and a method for determining the position of a communication platform.

According to an exemplary embodiment of the present invention, a system for determining the position of a communication platform is disclosed that comprises a first communication platform and a second communication platform. In this case, at least the first communication platform is in communication connection with the second communication platform, whereby the communication connection can be embodied as a focusable communication connection. In this way, the direction or orientation of the focusing of the communication connection can be determined. Consequently, this determinable focusing of the communication connection should enable the determination of a position of the second communication platform.

According to another exemplary embodiment of the present invention, a first communication platform is disclosed that can be in communication with a second communication platform. The communication connection may again be formed as a focusable communication connection, from which the direction or orientation of the focusing of the communication connection can be determined.

Consequently, a position of the second communication platform may be determined through this determinable focusing of the communication connection.

According to another exemplary embodiment of the present invention, a second communication platform indicates that it can receive a communication connection from a first communication platform, whereby the communication connection may again be formed as a focusable communication connection. The direction or orientation of the focusing of the communication connection can again be determined, whereby a position of the second communication platform is determined by the determinable focusing of the communication connection.

According to another exemplary embodiment of the present invention, a method for determining the position of a communication platform is disclosed, comprising the steps of providing a communication connection between a first communication platform and a second communication platform, whereby at least the first communication platform can be in communication with the second communication platform, whereby the communication connection is formed as a focusable communication connection, determines the direction or orientation of the focusing of the communication connection, and determines a position of the second communication platform through the focusing of the determinable focusing of the communication connection.

The present invention describes a system and method for determining the position of a first communication platform by using another communication platform.

In the context of the present invention, the term communication platform should not be considered as limiting. Rather, depending on its role in the system and according to the invention, a communication platform should only needs to be able to provide an outgoing communication connection or be able to accept an incoming communication connection. The communication connection does not thereby have to be considered in a limiting sense, as in the case of a conventional data transmission connection, but may be able to transmit only identifiable information such as an of such a communication connection.

It is also conceivable that the communication connection according to the invention only provides information on the presence or absence of the communication connection. For example, by way of example with reference to a laser communication connection that extends from a communication platform and is detected by a further communication platform, for example by using a suitable photodiode, it may be sufficient for the inventive concept if the photodiode is capable of detecting the presence or absence of the laser beam, insofar as the communication connection itself is identified by other appropriate means. For example, in one application of the second communication platform, only a (determined) communication connection may occur so that simple determination without identification of the same may be sufficient.

Preferably, the communication connection has a defined form, such as a focusing. The communication connection is therefore not omnidirectional, but has a defined geometric shape or form. Again, for example, a laser beam would have a substantially one-dimensional embodiment in a near-field in the form of a one-dimensional line. If this laser beam is then detected, it gives at least the position of the communication platform detecting the laser beam that, along with the receiver, such as a suitable receiver diode, must be located in the longitudinal direction of the laser beam.

In the far-field, in turn, for example at a distance of more than 100 or 1000 km from the source of origin of the laser beam, the laser beam can, however, no longer be regarded as an idealized one-dimensional line, but has a substantially cone-shaped configuration with a cone radius that is dependent on the distance from the origin of the laser beam. Thus, the communication connection has a propagation volume, in which the communication connection can be detected. Thus, in the far-field there can be at least the case where such a laser is detected and where the receiver element is located at least in the propagation volume of the cone of the laser beam. However, it may be possible to verify with sufficient precision the exact geometry and the propagation volume of the communication connection using known mathematical methods.

One aspect of the present invention is therefore the detection of the presence of such a communication connection, which subsequently results in the knowledge that the receiver must be located at least in the propagation volume of this communication connection.

If the spatial propagation of the communication connection is now known with sufficient precision and based on the knowledge of the propagation, it is also possible to determine a position of the receiver element. Thus if for example, the position of a first communication platform, which is arranged as a transmitter for the communication connection, is deter with sufficient accuracy, while simultaneously the propagation direction and geometry of the communication connection are known, then the position of another communication platform, of a receiver communication platform, which is arranged in the propagation volume of the communication connection, can be deduced.

In this case, on the one hand, the information regarding the position, direction, orientation, and the propagation volume of the communication connection is transmitted via the communication connection, or can itself deduce its position from the presence of the signal via the receiving communication platform.

Thus, particularly preferred is a satellite-based location determination using a laser communication between a satellite, hence an apogee platform, and a near-earth returning platform, such as airplanes, drones, UAVs, vessels, balloons, etc. The ability to determine the location or to determine the direction of flight of the receiving communication platform is thus achieved in that a communication connection with a known propagation direction and propagation geometry or propagation volume, e.g. a laser beam, is detected, which communication connection is transmitted from a communication platform such as a satellite with a (high-precision) known position.

In this case the communication signal can itself provide a timing reference signal or flight time signal that can be compared with a time reference signal in the receiving communication platform, where appropriate, thereby simultaneously enabling the determination of the distance of the second communication platform from the first communication platform by determination of the elapsed time. Thus, starting from the known position of the first communication platform as well as the propagation geometry and propagation speed of the communication connection, it is also possible to determine the height of the second communication platform.

In addition, the inventive system based on a laser communication terminal installed on a satellite platform, as well as an aircraft serving as a receiving second communication platform, will be described. However, as previously stated, the exemplary embodiment of the communication platforms and the communication connection should not be considered as limiting.

The apogee satellite platform (efP) comprises a laser communication terminal, which is adapted to provide a communication connection to another communication platform using a laser beam. This communication platform can, for example, be arranged to be stationary on the earth's surface, whereby such a communication connection is substantially statically configured, or it can be associated with a mobile communication platform, whereby, due to the focused configuration of the communication connection, as well as the relative movement of the second communication platform with respect to the first communication platform, tracking of the communication connection oriented towards the second communication platform may be necessary.

In the case of the static embodiment of the communication connection, it may be sufficient fir a second communication platform, which, for example flies through the volume of the communication connection, to identify the communication connection. The mere presence of such a communication connection may also be sufficient, in particular by using firth information such as the geometric configuration of the stationary communication connection, to determine a position of the second communication platform in the propagation volume of the communication connection.

In the case of a variable aligned communication connection, for example in the case where the communication connection to the second communication platform is tracked, it can itself transmit more information with respect to the position of the first communication platform and/or the direction or orientation, or also with respect to the propagation volume of the communication connection, and provide this to the second communication platform.

The positioning of the second communication platform in the propagation volume of the communication connection now allows determination of the (own) position through the second communication platform, for example, based on the data received from the first data communication platform. Likewise, the first communication platform can directly transmit usable position information so that each communication platform that receives the information can determine the actual position due to the fact that it can receive the information.

Thus, a laser communication terminal can be used on a satellite platform not only for information transmission but also for determining the location of the receiver. Starting from a geostationary satellite and a conventional laser communication terminal, a laser beam generated on the earth's surface has a footprint with a diameter of about 1 km. An outstation for the satellite platform and thus a communication platform such as, for example, a near-earth returning platform, which can detect the laser beam, thus knows that it is located in the propagation volume of the communication connection between the satellite platform and the 1 km diameter footprint on the earth's surface. The extent to which the receiving, second platform is located at the center or at the edge of the propagation volume of a communication connection, can be detected, for example, by evaluating a reception power level. Using a known dynamic local scanning procedure, the position within the propagation volume, in particular the distance and the direction of an acquired propagation center axis, can likewise more accurately determine the position of the second communication platform in the propagation volume of the communication connection.

If, in addition, time alignment of the transmitted communication signal between the first communication platform and the second communication platform still takes place, then the distance between a first communication platform and second communication platform can be determined from the elapsed time as well as the propagation speed of the communication connection (normal speed of light). With this information, a three-dimensional position of the second communication platform in the propagation volume of the communication connection can be determined and thus, based on a high-precision known position of the first communication platform, the position of the second communication platform.

Position determination as previously described, in particular based on a laser communication terminal, may, in particular, for example, provide increased immunity to near-earth jammers of radio frequency signals from GPS or Galileo. Especially in the case of a laser method, this would only be interfered with by an object directly introduced into the laser beam between the first communication platform and a second communication platform.

The advantage with respect to magnetic-based or initial system-based localization methods is much higher accuracy as well as consistent positioning accuracy during a possible flight time, especially since no relative error needs to be added to an overall error.

Particularly advantageous is the additional use of several known position determination methods to provide a redundant position determination and, more particularly, to enable mutual position verification.

In addition, preferred embodiments of the inventive system for determining the position of a communication platform are described below.

According to a other preferred embodiment of this invention, the first communication platform may provide the direction or orientation of the focusing of the communication connection, the position of the first communication platform and/or the position of the second communication platform with respect to the second communication platform. The second communication platform can subsequently determine a position in the propagation volume of the communication connection from this information.

According to another preferred embodiment of this invention, the first communication platform may be arranged to track the focused communication connection of the second communication platform.

Thus, the communication connection between the first communication platform and the second communication platform can be maintained independently of movement and position. Preferably, during tracking of the communication connection, the actual position or orientation of the geometric propagation volume of the communication connection can be transmitted to the second communication platform. This enables the actual position of the second communication platform to be determined through a continuous determination of the position of the second communication platform in the propagation volume of the communication connection.

According to a further preferred embodiment of this invention, the focusable communication connection may be in the form of a directional communication connection.

According to another preferred embodiment of this invention, information, in particular an elapsed time signal for the height determination of the second communication platform, may be transmitted via the communication connection.

This enables the distance between the first communication platform and the second communication platform to be determined, and thus the position of a spherical surface, whereby the first transmitting communication platform is arranged at the center of the sphere. By means of the formation of the intersection of the spherical surface with the geometric propagation or the propagation volume of the communication connection, the possible position of the second communication platform can be further restricted and determined more accurately.

According to another preferred embodiment of this invention, the communication connection may comprise an identification feature to uniquely identify the communication connection.

So, for example, a second communication platform, which (unexpectedly) receives a communication connection can determine the position by using the identification feature and, possibly, further information about the position or orientation of the communication connection belonging to this identification feature. This allows a flexible response to various independent communication connections implemented through the second communication platform.

According to another preferred embodiment of this invention, the direction or orientation of the focus of the communication connection and/or the position of the first communication platform can be identified or determined by the identification feature.

For example, the second communication platform, by querying a database, can identify information concerning the direction and orientation of the focusing of communication connection belonging to the identification feature, and can thus flexibly respond to an (unexpected) incoming communication connection, and determine its position.

According to another preferred embodiment of this invention, the second communication platform may be so arranged that it determines its own position on flying through a focused communication connection.

This may be particularly relevant when the communication connection is not a tracked connection of the second communication platform, but, for example, is connected to a stationary earth out-station or is aimed at defined points, for example, on the earth's surface. Thus, the geometric shape and propagation volume of the communication connection is, in essence, at least temporarily stationary, whereby the second communication platform can still determine its own position by means of the knowledge of the direction and orientation of the focusing of this communication connection. In addition, a communication platform can determine its own position by using a tracked communication connection of another communication platform along with information about the direction and orientation of the propagation volume of the communication connection.

According to another preferred embodiment of this invention, the communication connection may be formed as an optical communication connection, in particular as a laser communication connection.

According to another preferred embodiment of this invention, the first communication platform may be an apogee platform, especially a platform for operation outside the earth's atmosphere, more particularly a satellite, more particularly in a low-earth-orbit (LEO) or geostationary orbit (GEO) and/or the second communication platform may be a near-earth, returning platform, particularly a platform for operation in the earth's atmosphere, more particularly an aircraft, more particularly an airplane.

Further embodiments and advantages of the invention will become apparent from the following description. In various figures, identical or similar elements are provided with the same or similar reference signs.

BRIEF DESCRIPTION OF THE DRAWING FIGURES

Representations in the figures are schematic and not to scale, but may reflect qualitative proportions.

In the drawings.

DETAILED DESCRIPTION

Figure 1:
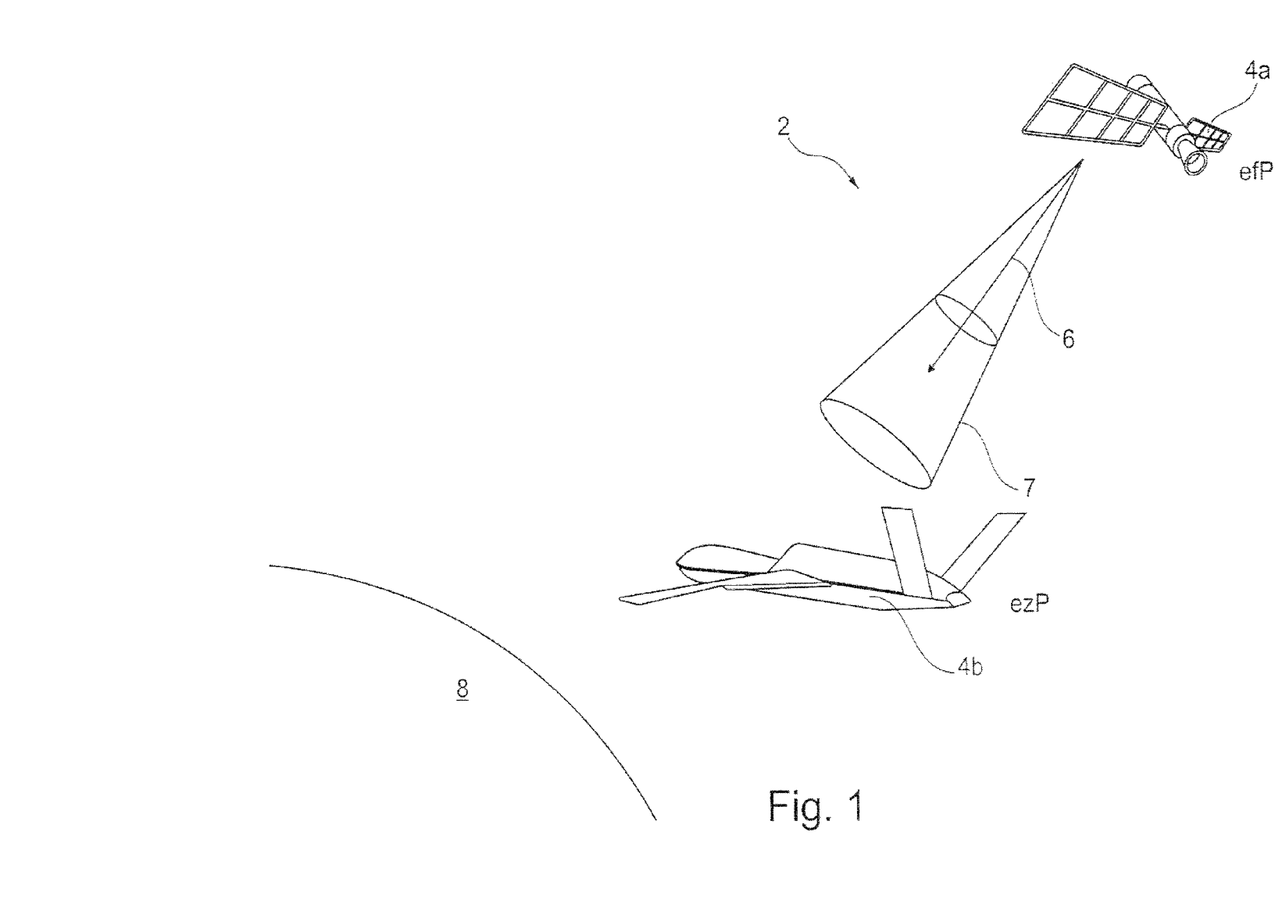
FIG. 1 shows an exemplary embodiment of the inventive system for determining the position of a communication platform.

FIG. 1 shows an exemplary embodiment of the inventive system fir determining the position of a communication platform.

The system for position determination 2 has a first communication platform 4a arranged in the earth's atmosphere above the earth's surface 8, an example of an apogee satellite platform efP, as well as a second communication platform 4b, an example of a near-earth returning communication platform ezP. A communication connection 6 with a propagated volume of the communication connection 7 is formed between the two communication platforms 4a,b. The propagated volume(s) of the communication connection 6 may be understood as that volume in which a receiver arranged on the second communication platform 4b receives a signal from the first communication platform 4a, which can detect the signal from the communication connection 6 or can receive the data transmitted via the communication connection 6.

The position of the first communication platform 4a can itself be known in turn, as well as the direction and orientation of the propagation volume 7 of the communication connection 6. This information can, at least partially, be transmitted via the communication connection 6 to the second communication platform 4b, or it may itself hold the detected information ready, and only detect the communication connection 6 or identify it is a defined identification feature.

Thus, if the second communication platform 4b receives information regarding the communication connection 6 or position and/or orientation information of the first communication platform 4a and the communication connection 6, then the second communication platform 4b can determine its position in the propagation volume 7 of the communication connection 6 and thus its (absolute) position with respect to the earth 8.

Figure 2A:
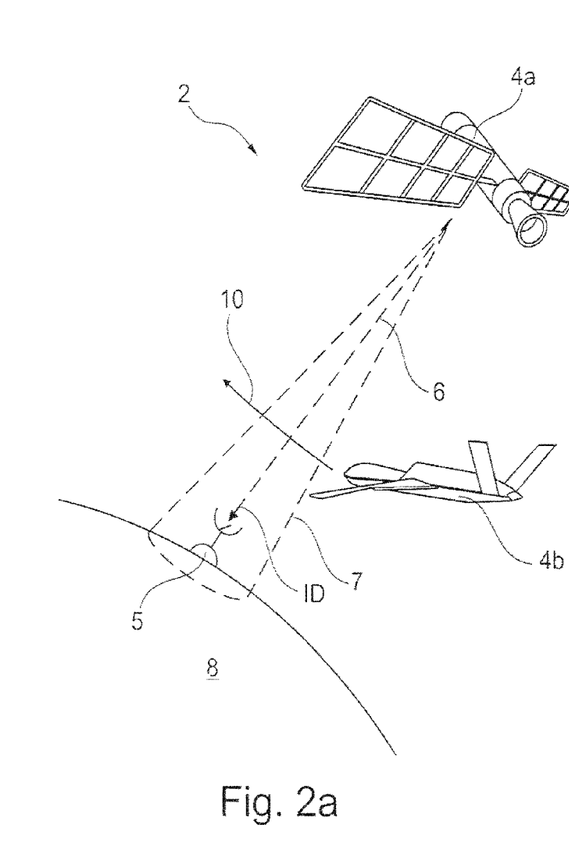
FIGS. 2a, 2b show further exemplary embodiments of position determination of a communication platform according to this invention.

Further reference to FIG. 2a illustrates an exemplary embodiment of the inventive system with a stationary communication connection 6.

FIG. 2a corresponds substantially to FIG. 1 except that the first communication platform 4a is in communicative contact with a ground station 5 on earth 8 by using the communication connection 6. Communication connection 6 again has a propagation volume 7. The second communication platform 4b flies through the volume 7 of the communication connection 6 on its way or on its flight path 10. The second communication platform 4b may now already have available, or determine, or access information in order to determine, for example, the propagation volume 7 of this communication connection 6. This information simultaneously includes position information, for example, of the ground station 5, the position of the communication platform 4a and/or the position and/or orientation of the propagated volume 7. The communication connection 6 may comprise an identification feature ID that uniquely identifies the communication connection 6, and thus simplifies the obtaining of information about the second communication platform 4b, for example by querying a database. With the knowledge of the (stationary) communication connection 6 in FIG. 2a, the second communication platform 4b can determine its position on its flight path 10 when flying through the propagation volume 7, and thus a relative position with respect to the ground station 5 and thus to earth 8.

Figure 2B:
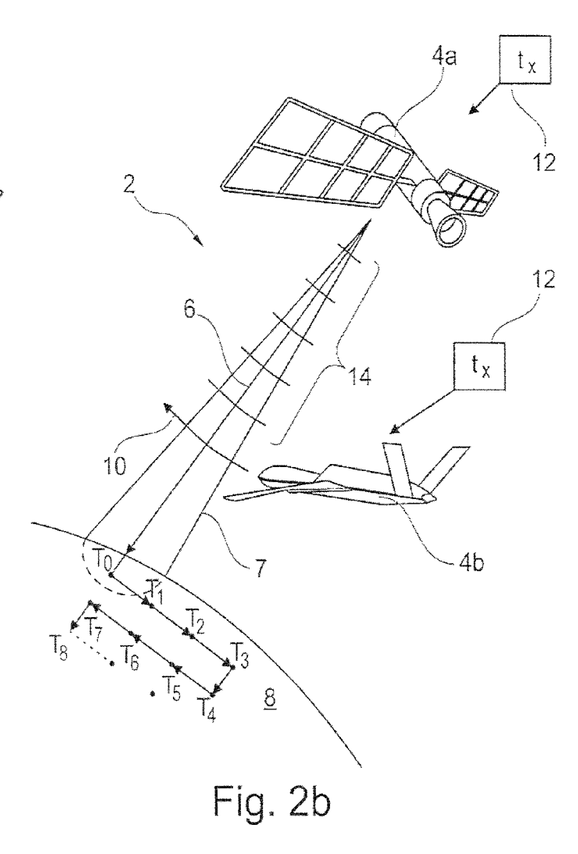

Still referring to FIG. 2b, another exemplary embodiment of the system 2 according to the invention is described.

In this case, the exemplary communication connection 6 is not aligned with the second communication platform 4b, or a ground station 5, but to certain pre-defined locations on the earth's surface 8. These positions are acquired at the various points in times $T_0, T_1 \ldots T_8 \ldots T_n$.

The satellite laser, therefore, does not principally need to send information showing its position. If the satellite scans the earth according to a previously agreed "flight plan," the receiver only needs the time information and information about the "flight plan," and thus the scanning, or at what (absolute) time the communication connection is aligned to which location point on the earth's surface.

The first communication platform 4a can provide the alignment with a particular earth position at a time $T_x$ via a time information 12 $t_x$. The second communication platform 4b can also have a (synchronous) time information 12 $t_x$. Together with the knowledge of what position on the earth's surface 8 is acquired at a certain time $T_x$, the second communication platform 4b can thus determine the position and/or orientation of the communication connection 6, in particular its propagation volume 7. When flying through propagation volume 7 of the communication connection 6 on flight path 10 of the second communication platform 4b and taking into account a certain point in time $T_x$, the second communication platform 4b can thus determine the actual current orientation of the communication connection 6, for example, by accessing a database, and thus determine the actual orientation of the dynamically variable communication connection 6. The second communication platform 4b can again determine its position in the propagation volume 7, and thus relative to the earth's surface 8, through this instantaneous orientation of communication connection 6.

At the same time, and based on the time information 12, the first communication platform 4a can transmit the time information 14 in the communication connection 6. A comparison of the time information 14 received by the second communication platform 4b with its (internal) time information 12 $t_x$, and taking into account the propagation speed of the communication signal of the communication connection 6, enables the distance from the first and second communication platform 4a,b as well as the flying height of the second communication platform 4b relative to the earth's surface 8 to be determined.

Although not explicitly shown in FIGS. 1 and 2a, this height determination of the second communication platform 4b by using the time information 12/14 can also be used there.

Figure 3:
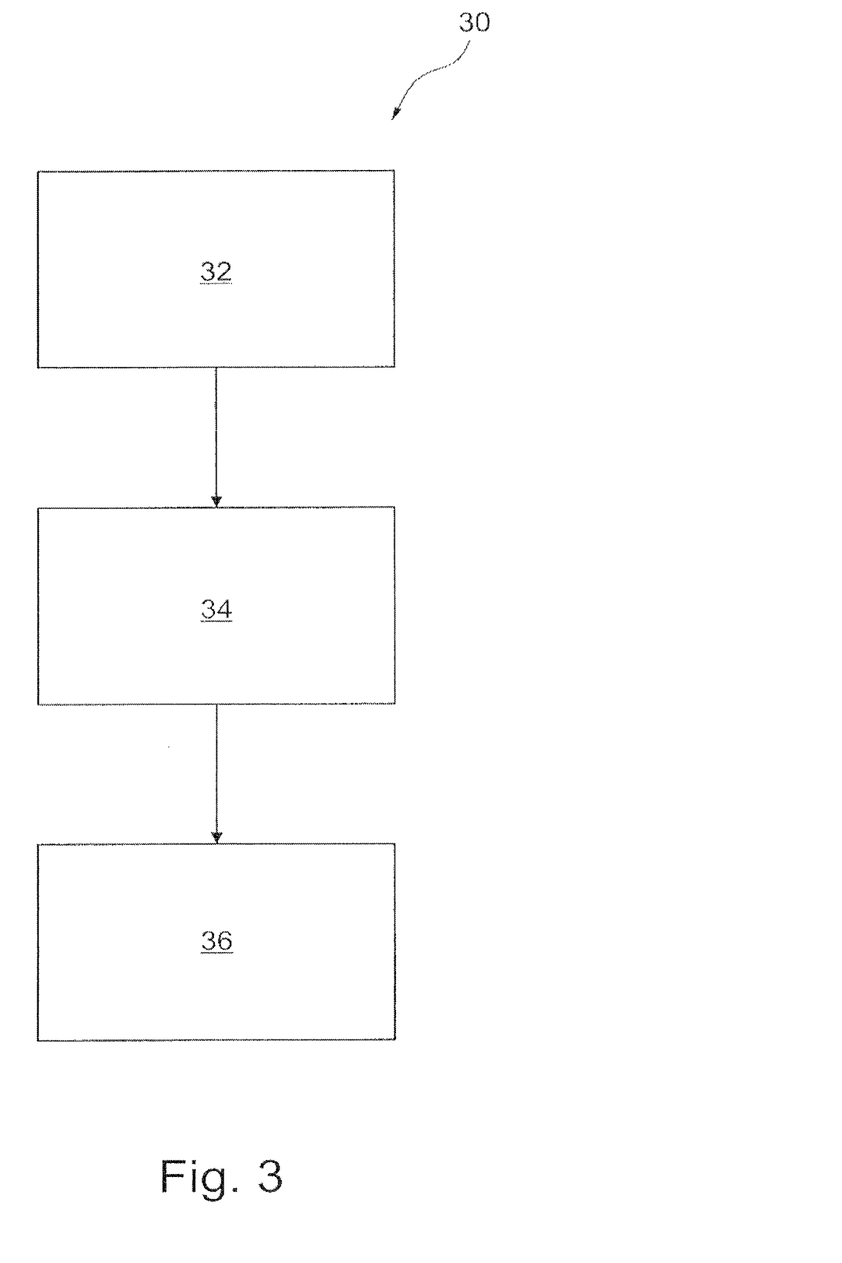
FIG. 3 shows an exemplary representation of the method for determining the position of a communication platform.

Referring now to FIG. 3, an exemplary representation of the inventive method for determining the position of a communication platform is shown.

FIG. 3 illustrates a method 30 for determining the position of a communication platform, comprising the steps of the provision 32 of a communication connection 6 between a first communication platform 4a and a second communication platform 4b, whereby at least the first communication platform 4a can be in communication connection 4b with the second communication platform 6, whereby the communication connection 6 is formed as a focusable communication connection, determination 34 of the direction or orientation of the focus of the communication connection 6, and determination 36 through the determinable focus of the communication connection of a position of the second communication platform 4b.

In addition it should be noted that "having" or "comprising" do not exclude any other elements or steps, and that "a" and "an" do not exclude any plurality. It should also be noted that features or steps which have been described above with reference to one of the embodiments or configurations can be used even in combination with other features or steps of other exemplary embodiments or configurations. Reference signs in the claims should not be regarded as limiting.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE SIGNS

2 System
4a,b First, second communication platform
5 Ground station
6 Communication connection
7 Propagation volume of the communication connection
8 Earth/earth's surface
10 Flight path/flight direction
12/14 Time information

What is claimed is:

1. A system for determining the position of a communication platform, the system comprising:
    a first communication platform, which is an apogee platform; and
    a second communication platform;
    wherein the first communication platform is configured to establish a focused communication connection with the second communication platform, wherein the focused communication connection has a propagation volume with a radius that increases from the first communication platform to the second communication platform and the second communication platform is located at a position within a first radius of the propagation volume;
    wherein the second communication platform is configured to determine a direction and orientation of the focused communication connection,
    wherein the second communication platform is configured to determine the position of the second communication platform relative to the first radius of the propagation volume,
    wherein one of the first and second communication platforms is configured to determine a position of the second communication platform based on the determined direction and orientation of the focused communication connection and the determined position of the second communication platform relative to the first radius of the propagation volume, and
    wherein the focused communication connection is an optical communication connection.

2. The system according to claim 1, wherein the first communication platform is configured to transmit the direction or orientation of the focused communication connection, a position of the first communication platform, or the position of the second communication platform to the second communication platform.

3. The system according to claim 1, wherein the first communication platform is configured to track the focused communication connection of the second communication platform.

4. The system according to claim 1, wherein the focused communication connection is a directional communication connection.

5. The system according to claim 1, wherein the first communication platform is configured to transmit, via the focused communication connection, an elapsed time signal that can be used for a height determination of the second communication platform.

6. The system according to claim 1, wherein the communication connection has an identification feature to uniquely identify the communication connection.

7. The system according to claim 6, wherein the direction or orientation of the focused communication connection or the position of the first communication platform can be determined using the identification feature.

8. The system according to claim 1, wherein the second communication platform is aligned on flying through the focused communication connection to determine the second communication platform's own position.

9. The system according to claim 1, wherein the focused communication connection is a laser communication connection.

10. The system according to claim 1, wherein the first communication platform is a Low Earth Orbit or geosynchronous orbit satellite and the second communication platform is an aircraft.

11. A method for determining the position of a communication platform, the method comprising:
    establishing, by a first communication platform, a focused communication connection with the second communication platform, wherein the focused communication connection has a propagation volume with a radius that increases from the first communication platform to the second communication platform and the second communication platform is located at a position within a first radius of the propagation volume;
    determining the position of the second communication platform relative to the first radius of the propagation volume;
    determining a direction and orientation of the focused communication connection; and
    determining a position of the second communication platform based on the determined direction and orientation of the focused communication connection and the determined position of the second communication platform relative to the first radius of the propagation volume,
    wherein the first communication platform is an apogee platform,
    wherein the focused communication connection is an optical communication connection.

12. The method according to claim 1, further comprising:
    transmitting, by the first communication platform to the second communication platform, the direction or orientation of the focused communication connection, a position of the first communication platform, or the position of the second communication platform.

13. The method according to claim 11, further comprising: tracking, by the first communication platform, the focused communication connection of the second communication platform.

14. The method according to claim 11, wherein the focused communication connection is a directional communication connection.

15. The method according to claim 11, further comprising: transmitting, by the first communication platform via the focused communication connection, an elapsed time signal that can be used for the height determination of the second communication platform.

16. The method according to claim 11, wherein the communication connection has an identification feature to uniquely identify the communication connection.

17. The method according to claim 16, wherein the direction or orientation of the focused communication connection, or the position of the first communication platform is determined using the identifier.

18. The method according to claim 11, wherein the second communication platform is aligned on flying through the focused communication connection to determine the second communication platform's own position.

19. The system according to claim 11, wherein the optical communication connection is a laser communication connection.

\* \* \* \* \*